United States Patent
Martin et al.

(10) Patent No.: US 11,297,756 B2
(45) Date of Patent: Apr. 12, 2022

(54) AGRICULTURAL DEVICE HAVING A ROTATABLE FRAME PORTION

(71) Applicants: Charles H. Martin, Loysville, PA (US); Dominic R. Martin, Loysville, PA (US)

(72) Inventors: Charles H. Martin, Loysville, PA (US); Dominic R. Martin, Loysville, PA (US)

(73) Assignees: Charles H. Martin, Loysville, PA (US); Dominic R. Martin, Loysville, PA (US)

( * ) Notice: Subject to any disclaimer, the term of this patent is extended or adjusted under 35 U.S.C. 154(b) by 392 days.

(21) Appl. No.: 16/415,733

(22) Filed: May 17, 2019

(65) Prior Publication Data

US 2019/0350122 A1 Nov. 21, 2019

Related U.S. Application Data

(60) Provisional application No. 62/674,237, filed on May 21, 2018.

(51) Int. Cl.
*A01B 73/06* (2006.01)
*A01C 7/08* (2006.01)

(52) U.S. Cl.
CPC ............... *A01B 73/06* (2013.01); *A01C 7/08* (2013.01)

(58) Field of Classification Search
CPC ............ A01B 73/06; A01C 7/08; A01C 7/208
See application file for complete search history.

(56) References Cited

U.S. PATENT DOCUMENTS

| 3,356,301 A | 12/1967 | Barber et al. |
| 4,117,893 A | 10/1978 | Kinzenbaw |
| 4,506,904 A | 3/1985 | Kinzenbaw |

(Continued)

FOREIGN PATENT DOCUMENTS

| DE | 941820 C | 4/1956 |
| EP | 1920995 B1 | 10/2010 |
| EP | 3257347 A1 | 12/2017 |

OTHER PUBLICATIONS

Monosem, Inc; "Monosem—Narrow Transport", monosem-inc.com, Nov. 16, 2010, https://web.archive.org/web/20101116132255/http://monosem-inc.com/pdfs/ng%2B4.nt.09.pdf.

(Continued)

*Primary Examiner* — Gary S Hartmann
(74) *Attorney, Agent, or Firm* — McNees Wallace & Nurick LLC (57) ABSTRACT

An agricultural device including a first frame portion rotatably carrying a second frame portion for carrying at least one agricultural module, the second frame portion being rotatable relative to the first frame portion between a first position generally perpendicular to a direction of travel of the device and a second position generally parallel to the direction of travel of the device, the first frame portion having a pair of rolling elements for supporting the first frame along a support surface. The pair of rolling elements is laterally movable relative to the first frame portion in a direction perpendicular to the direction of travel of the device. The pair of rolling elements continuously laterally surrounds the second frame when viewed from behind a forward direction of travel of the device.

20 Claims, 9 Drawing Sheets

(56) References Cited

U.S. PATENT DOCUMENTS

| | | | |
|---|---|---|---|
| 5,346,019 A | 9/1994 | Kinzenbaw et al. | |
| 5,787,988 A | 8/1998 | Harlan et al. | |
| 6,076,613 A * | 6/2000 | Frasier | A01B 73/065 111/57 |
| 6,213,034 B1 | 4/2001 | Raducha et al. | |
| 6,321,852 B1 | 11/2001 | Pratt | |
| 6,666,155 B2 * | 12/2003 | Paluch | A01C 7/06 111/54 |
| 6,691,629 B2 | 2/2004 | Paluch et al. | |
| 6,907,719 B2 | 6/2005 | Ligouy | |
| 8,807,236 B2 * | 8/2014 | Remoue | E06C 5/04 172/311 |
| 8,813,864 B2 | 8/2014 | Layton | |
| 9,072,214 B2 | 7/2015 | Connors et al. | |
| 9,179,591 B2 * | 11/2015 | Barnett | A01B 69/003 |
| 9,185,837 B2 * | 11/2015 | Barnett | A01D 67/005 |
| 9,271,437 B2 | 3/2016 | Martin et al. | |
| 9,533,612 B2 * | 1/2017 | Meenen | A01D 75/002 |
| 9,545,049 B2 * | 1/2017 | Barnett | A01B 73/00 |
| 9,930,821 B2 | 4/2018 | Clifford et al. | |
| 9,961,824 B2 | 5/2018 | Kinzenbaw et al. | |
| 10,051,783 B2 | 8/2018 | Bruer et al. | |
| 10,172,276 B2 * | 1/2019 | Peterson | A01B 63/006 |
| 10,980,165 B2 * | 4/2021 | Peterson | A01B 63/006 |
| 2006/0090910 A1 | 5/2006 | Houck | |
| 2018/0049362 A1 | 2/2018 | Totten et al. | |
| 2018/0220575 A1 * | 8/2018 | Kinzenbaw | A01C 7/208 |
| 2021/0298214 A1 * | 9/2021 | Fay, II | A01D 67/005 |

OTHER PUBLICATIONS

Case IH; "1245 Pivot Transport Trailing" caseih.com, Mar. 20, 2016; https://web.archive.org/web/2016320093752/ittps://www.caseih.com/northamerica/en-us/products/planting-seeding/1200-series-riser-planter/1245-pivot-transport-trailingcaseih.pdf.

* cited by examiner

AGRICULTURAL DEVICE HAVING A ROTATABLE FRAME PORTION

FIELD

The present disclosure is generally directed to agricultural devices, and more particularly directed to agricultural devices configured to form a reduced width profile for road travel.

BACKGROUND

Agricultural devices or equipment, such as planters typically include a wide, rigid frame in order to maximize the number of rows that can be planted in a single pass. However, roads separating crop fields typically have non-divided lanes for receiving vehicle traffic in opposite directions. These lanes typically are narrower than the wide, rigid planter frames, presenting safety hazards from other vehicular traffic when the planters travel on the roads.

What is needed is an agricultural device that is easily convertible between a working position and a reduced width road travel position, and a method for converting the agricultural device between the positions.

SUMMARY OF THE DISCLOSURE

In an exemplary embodiment, an agricultural device includes a first frame portion rotatably carrying a second frame portion for carrying at least one agricultural module, the second frame portion being rotatable relative to the first frame portion between a first position generally perpendicular to a direction of travel of the device and a second position generally parallel to the direction of travel of the device, the first frame portion having a pair of rolling elements for supporting the first frame along a support surface. The pair of rolling elements is laterally movable relative to the first frame portion in a direction perpendicular to the direction of travel of the device. The pair of rolling elements continuously laterally surrounds the second frame when viewed from behind a forward direction of travel of the device.

In another exemplary embodiment, a method for converting an agricultural device between a working position and a travel position, including providing a first frame portion rotatably carrying a second frame portion for carrying at least one agricultural module, the second frame portion being rotatable relative to the first frame portion between a first position generally perpendicular to a direction of travel of the device and a second position generally parallel to the direction of travel of the device, the first frame having a pair of rolling elements for supporting the first frame along a support surface, the first frame portion and the second frame arranged in a working position. The method further includes vertically raising the second frame portion relative to the support surface with the first frame portion. The method further includes laterally moving the pair of rolling elements and associated structure of the first frame portion away from one another in a direction perpendicular to the direction of travel of the device until the associated structure of the first frame portion and corresponding structure of the second frame are disengaged. The method further includes rotating the second frame portion from the first position to the second position, and laterally moving the pair of rolling elements and the associated structure of the first frame portion toward one another in a direction perpendicular to the direction of travel of the device until the pair of rolling elements have a predetermined spacing therebetween.

In a further exemplary embodiment, agricultural device includes a first frame portion rotatably carrying a second frame portion for carrying at least one agricultural module, the second frame portion being rotatable relative to the first frame portion between a first position generally perpendicular to a direction of travel of the device and a second position generally parallel to the direction of travel of the device, the first frame portion having a pair of rolling elements for supporting the first frame along a support surface. The pair of rolling elements is laterally movable relative to the first frame portion in a direction perpendicular to the direction of travel of the device. The at least one agricultural module is infinitely positionable along a length of the second frame portion.

An advantage of the present disclosure is an agricultural device maintaining a positive hitch weight in all operating positions.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

The present disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

Figure 1:
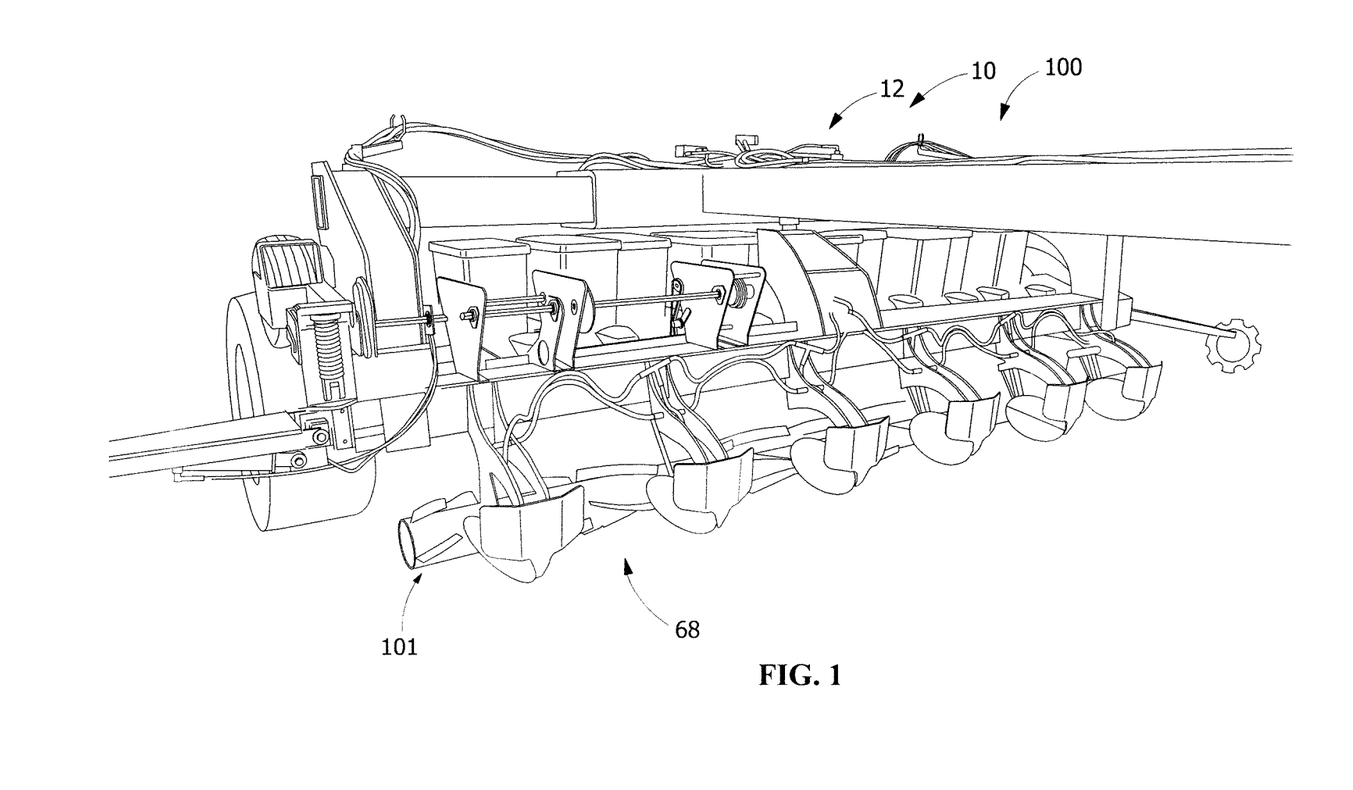
FIG. 1 shows an upper perspective rearwardly looking view of a planter in a planting position according to an embodiment of the present disclosure.

FIG. 1 shows an embodiment of an agricultural device such as an agricultural planter or agricultural seed planter or planter 10 according to the present disclosure. Planter 10 includes a frame 12 carrying or supporting components associated with a conventional planter such as at least one, and typically a plurality of modules or planter modules 100 of well-known construction that is not further discussed herein. The conventional planter further includes corresponding components associated with reduced tillage farming techniques, such as a crimping device 101. The crimping device is discussed in further detail in, for example, application Ser. No. 13/526,714, issuing as U.S. Pat. No. 9,271,437 titled Agricultural Field Preparation Device, which is incorporated by reference in its entirety herein and is not discussed further in this disclosure.

Figure 2:
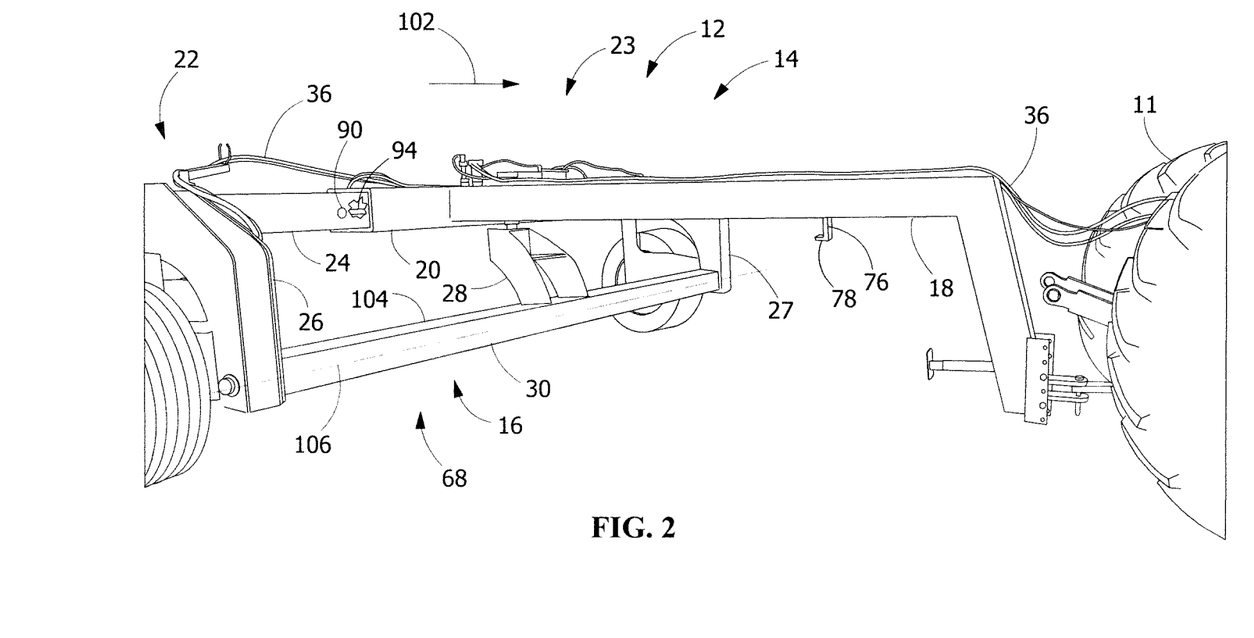
FIG. 2 shows an upper perspective rearwardly looking view of a frame of the planter in the planting position according to an embodiment of FIG. 1.
Figure 4:
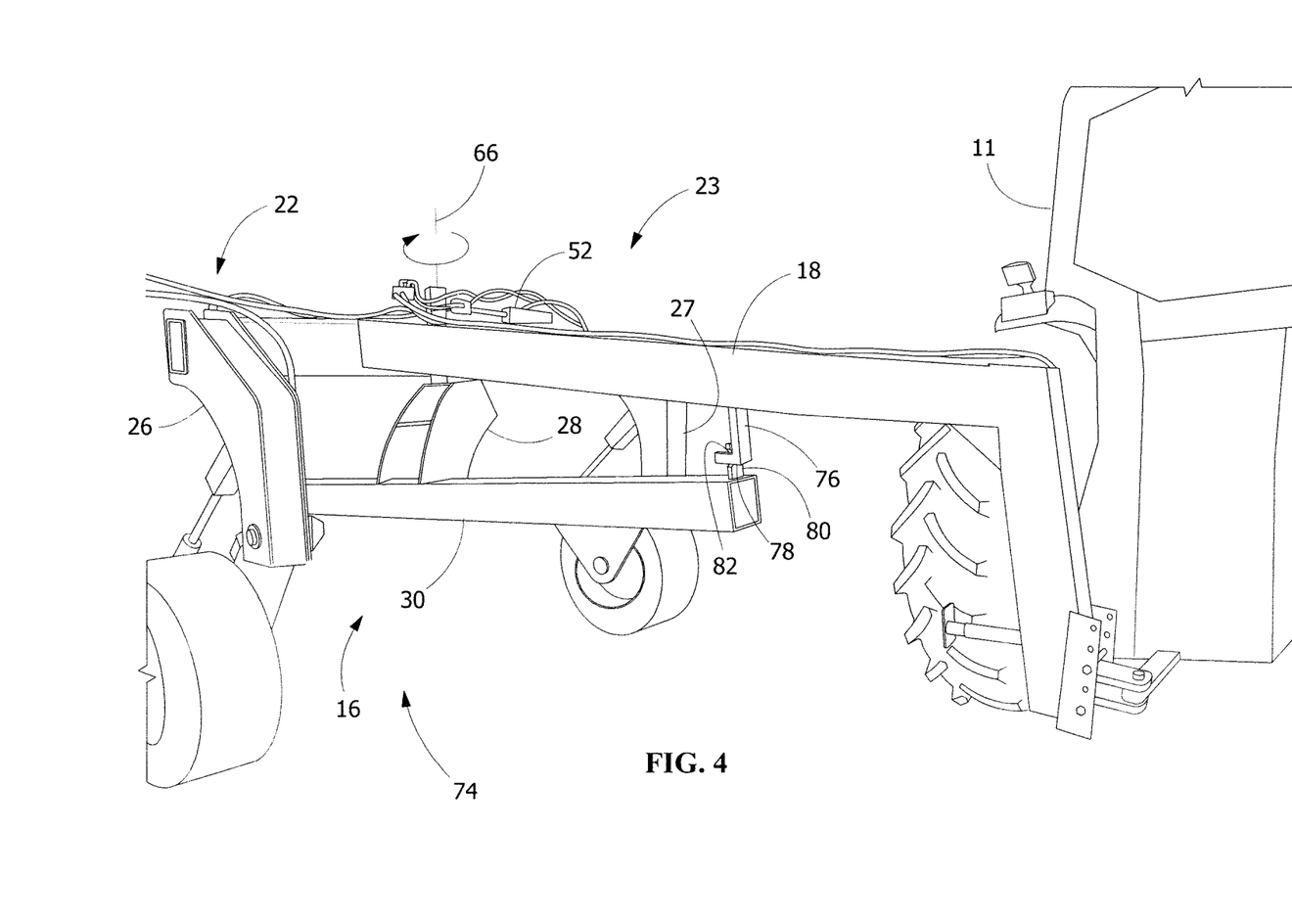
FIG. 4 shows an upper perspective rearwardly looking view of a frame of the planter in a road travel position according to an embodiment of FIG. 1.

However, frame 12 is not limited to a planter, and may be incorporated into a different agricultural implement or agricultural device or devices, such as a strip tilling machine, e.g., to crush cornstalks or other residue during the fall or other times of year for clearing a strip for the next crop, or use with other types of machines or applications. It is to be understood while other machines or apparatus may also be operatively connected to the agricultural device or to a vehicle, such as a tractor 11 (FIG. 4) or apparatus generally or specifically configured for use with the device, the other machines or apparatus may or may not be used in combination with the agricultural device. As shown in FIG. 2, frame 12 includes a tongue 18 that is towed by a vehicle such as a tractor 11 (FIG. 4). In one embodiment, the agricultural device may be operatively connected, i.e., towed by or otherwise secured to a vehicle, such as a tractor 11 (FIG. 4) or apparatus generally or specifically configured for use with the agricultural device, and may be used with another implement or application, or used without another implement. In other words, the agricultural device may be operatively connected to either an implement or to a vehicle, although the agricultural device may be used by itself or in combination with another implement.

FIGS. 2-7 show an embodiment of a frame 12 according to the present disclosure. As shown in FIG. 2, frame 12 includes a frame portion 14 that rotatably carries or rotatably structurally supports a frame portion 16. Frame portion 14 includes a tongue 18 that is pivotably secured to a towing vehicle or tractor 11. As further shown in FIG. 2, an end of tongue 18 opposite tractor 11 terminates at and is secured to a cross member or structural member 20, forming a T-shaped structure. As further shown in FIG. 6, a structural member 21 extends parallel to and is secured to structural member 20, with structural members 20, 21 collectively forming a cap of the T-shaped structure formed with tongue 18 forming part of frame portion 14.

Figure 6:
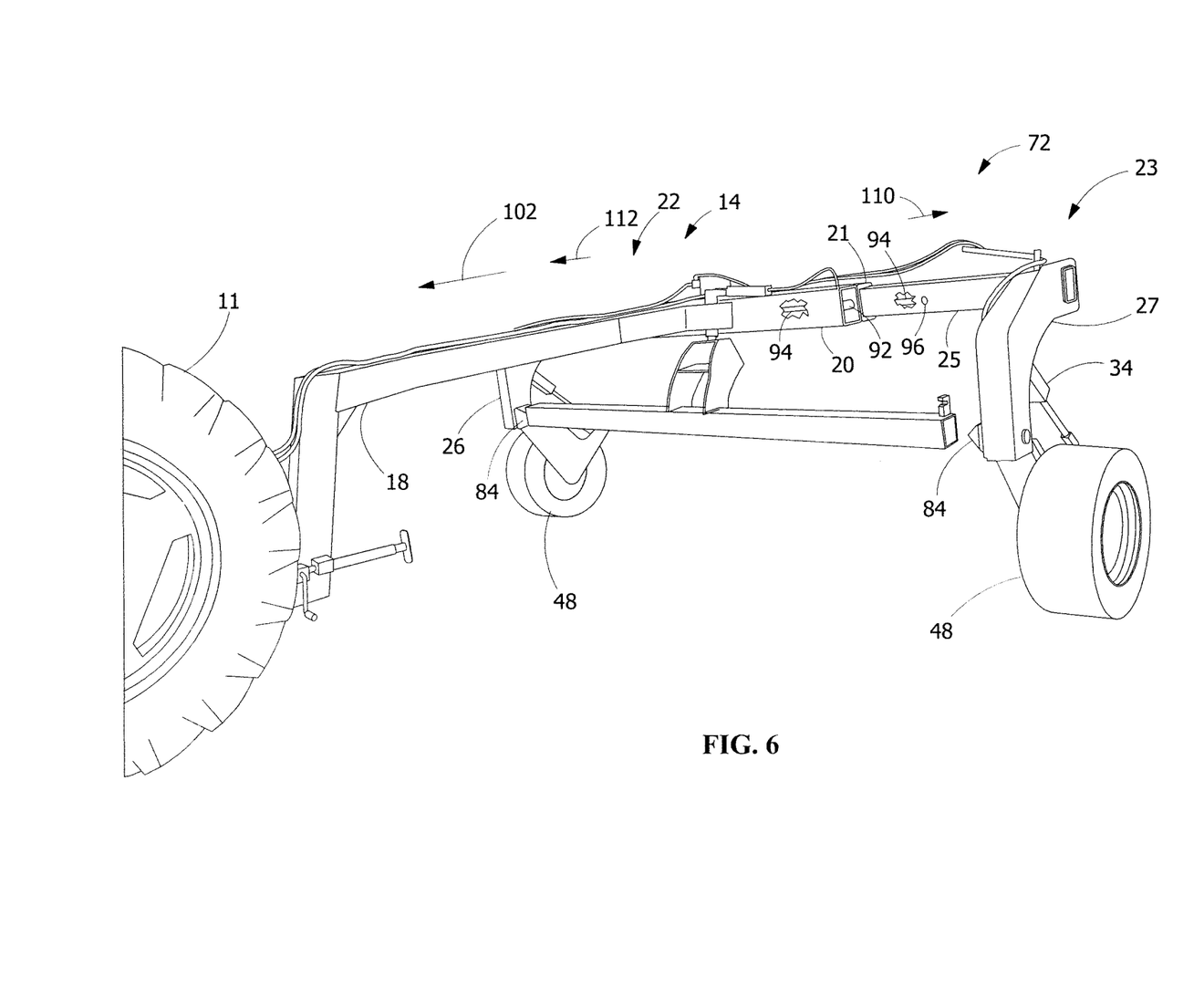
FIG. 6 shows a reverse upper perspective rearwardly looking view of the frame of the planter in a raised position according to an embodiment of FIG. 3.

As shown in FIG. 2, frame portion 14 further includes a structural member 22 including legs 24, 26 that are secured to each other to form an L-shaped structure. An opening is formed in structural member 20 for slidably receiving leg 24 therein. That is, telescoping member or leg 24 is telescopingly slidably received in structural member 20. Leg 24 includes a pivotable connection 90 for receiving one end of a hydraulic ram 94, with the other end of the hydraulic ram 94 received at a pivotable connection 92 (FIG. 6) formed in structural member 20. In other words, hydraulic ram 94 is entirely positioned within or inside of structural member 20 and the leg 24, resulting in a compact design. As shown in FIG. 6, frame portion 14 further includes a structural member 23 including legs 25, 27 that are secured to each other to form an L-shaped structure, with an opening formed in structural member 21 for slidably receiving leg 25 therein. That is, telescoping member or leg 25 is telescopingly slidably received in structural member 21. Leg 25 includes a pivotable connection 96 for receiving one end of a hydraulic ram 94, with the other end of the hydraulic ram 94 received at a pivotable connection 98 (FIG. 7) formed in structural member 21. In other words, hydraulic ram 94 is entirely positioned within or inside of structural member 21 and the leg 25, resulting in a compact design.

Figure 3:
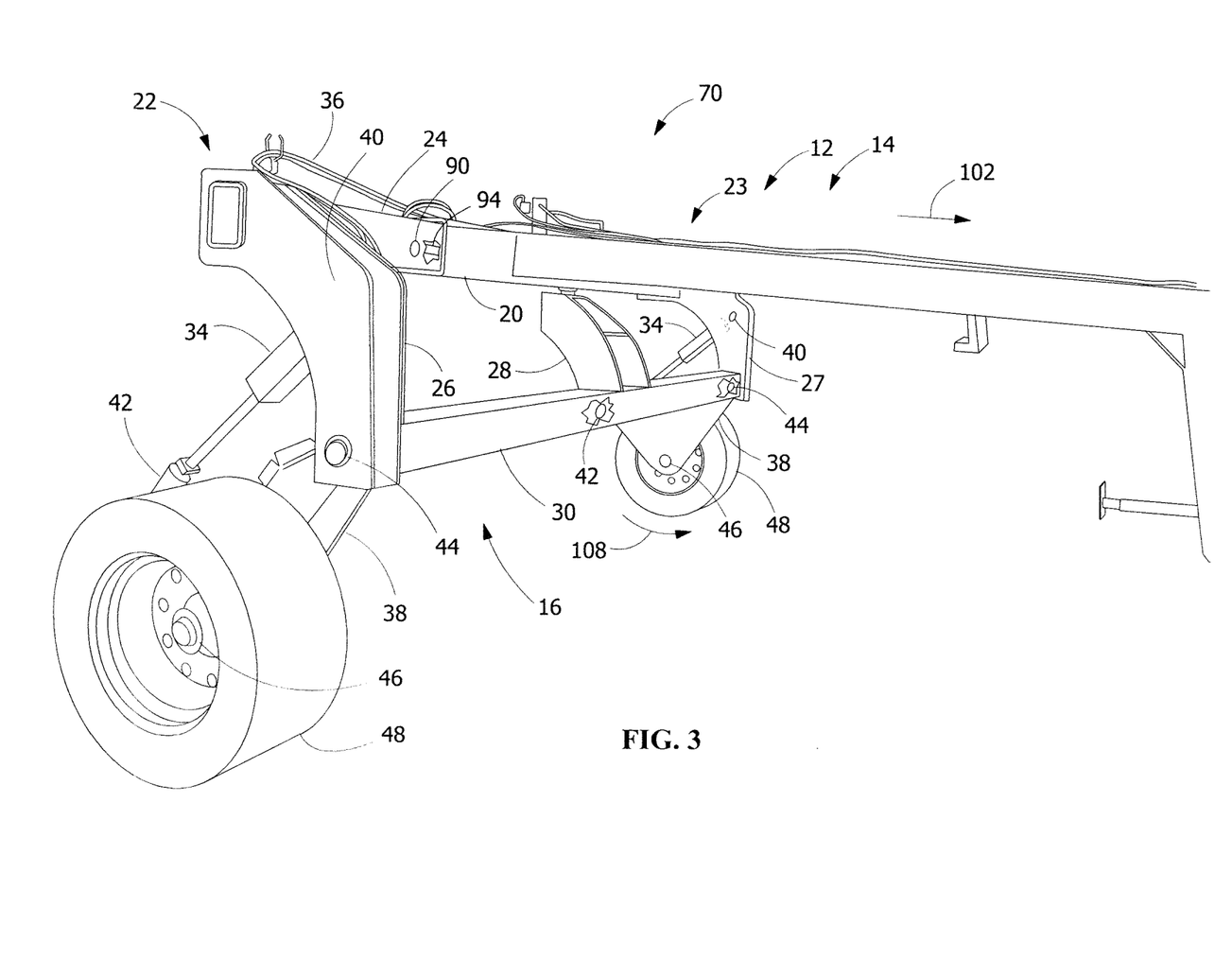
FIG. 3 shows an upper perspective rearwardly looking view of a frame of the planter in a raised position according to an embodiment of FIG. 1.
Figure 7:
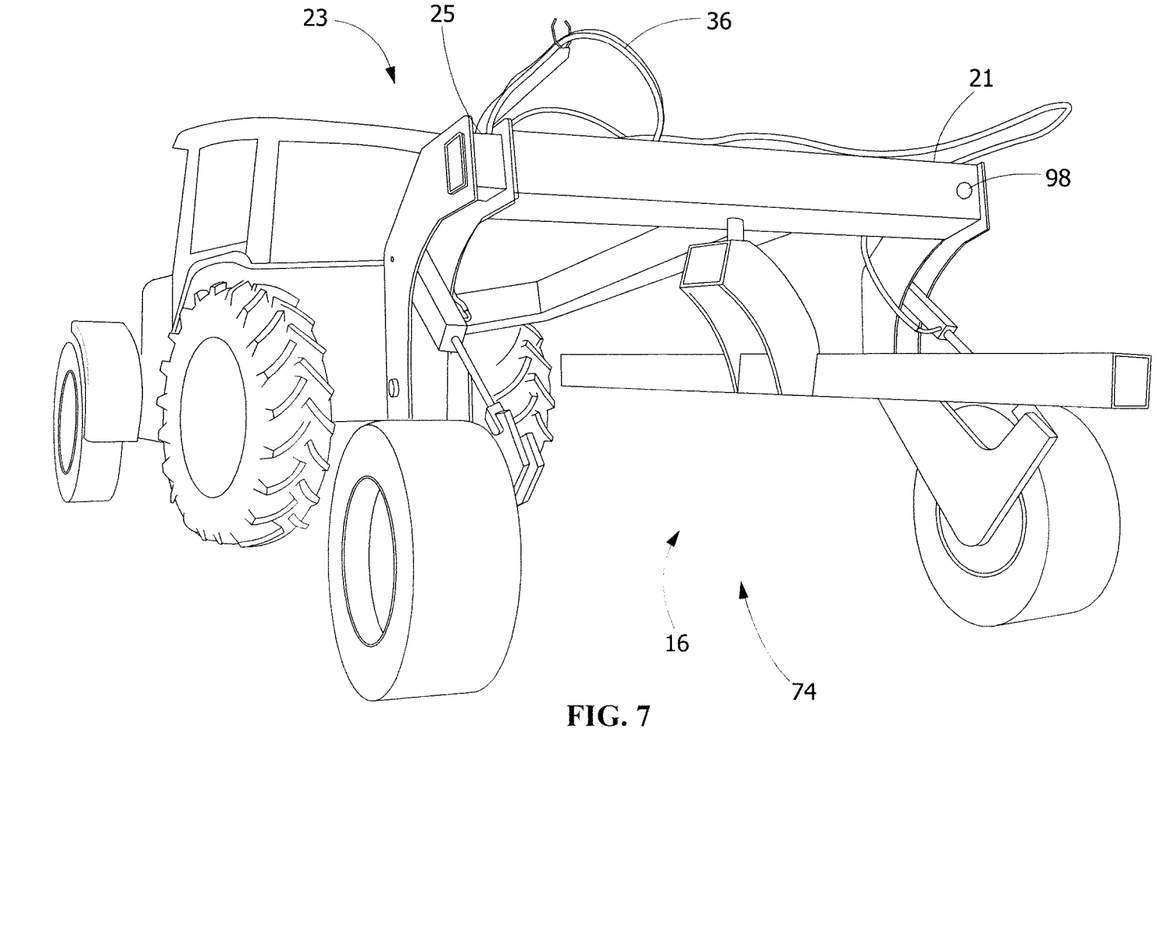
FIG. 7 shows an upper perspective forwardly looking view of a frame of the planter in a road travel position according to an embodiment of FIG. 1.

As shown in FIG. 3, leg 27 of structural member 23 includes a pivotable connection 40 for receiving one end of hydraulic ram 34, with the other end of the hydraulic ram 34 received at a pivotable connection 42 formed in one end of a crank 38. An opposed end of crank 38 includes a pivotable connection 44 for receiving an end of leg 27 opposite leg 25 (FIG. 7). Between opposed ends of crank 38 is a pivotable connection 46 formed with a rolling element such as a drive track or a wheel 48 rotatably supporting a portion of frame 12 (FIG. 1) along a support surface such as the ground. As a result of operable or pivotable connections 40, 42, 44, 46 between corresponding leg 27, crank 38, and hydraulic ram 34, in response to the actuation of hydraulic ram 34 as a result of flow of fluid to the hydraulic ram 34 from a fluid source (not shown) via interconnected fluid lines 36 such that the distance between opposed ends of hydraulic ram 34 is increased, the vertical position of pivotable connection 44 is raised relative to the ground. The position of pivotable connection 44 corresponds with one end of structural member 30 of frame portion 16, as will be discussed in further detail below. In other words, as pivotable connection 44 is raised, structural member of frame portion 16 is similarly raised. Stated another way, first frame portion 14 is adapted to raise frame portion 16. Conversely, in response to the actuation of hydraulic ram 34 as a result of flow of fluid to the hydraulic ram 34 from a fluid source (not shown) via interconnected fluid lines 36 such that the distance between opposed ends of hydraulic ram 34 is decreased, the vertical position of pivotable connection 44 is lowered relative to the ground. The position of pivotable connection 44 corresponds with one end of structural member 30 of frame portion 16, as will be discussed in further detail below. In other words, as pivotable connection 44 is lowered, structural member of frame portion 16 is similarly lowered. Stated another way, first frame portion 14 is adapted to lower frame portion 16. It is to be understood that other linkage configurations could also be used to achieve similar motions concerning the frame components.

It is to be understood that leg 26 of structural member 22 operates in a manner similar to leg 27 of structural member 23 described immediately above and is not repeated herein.

Figure 5:
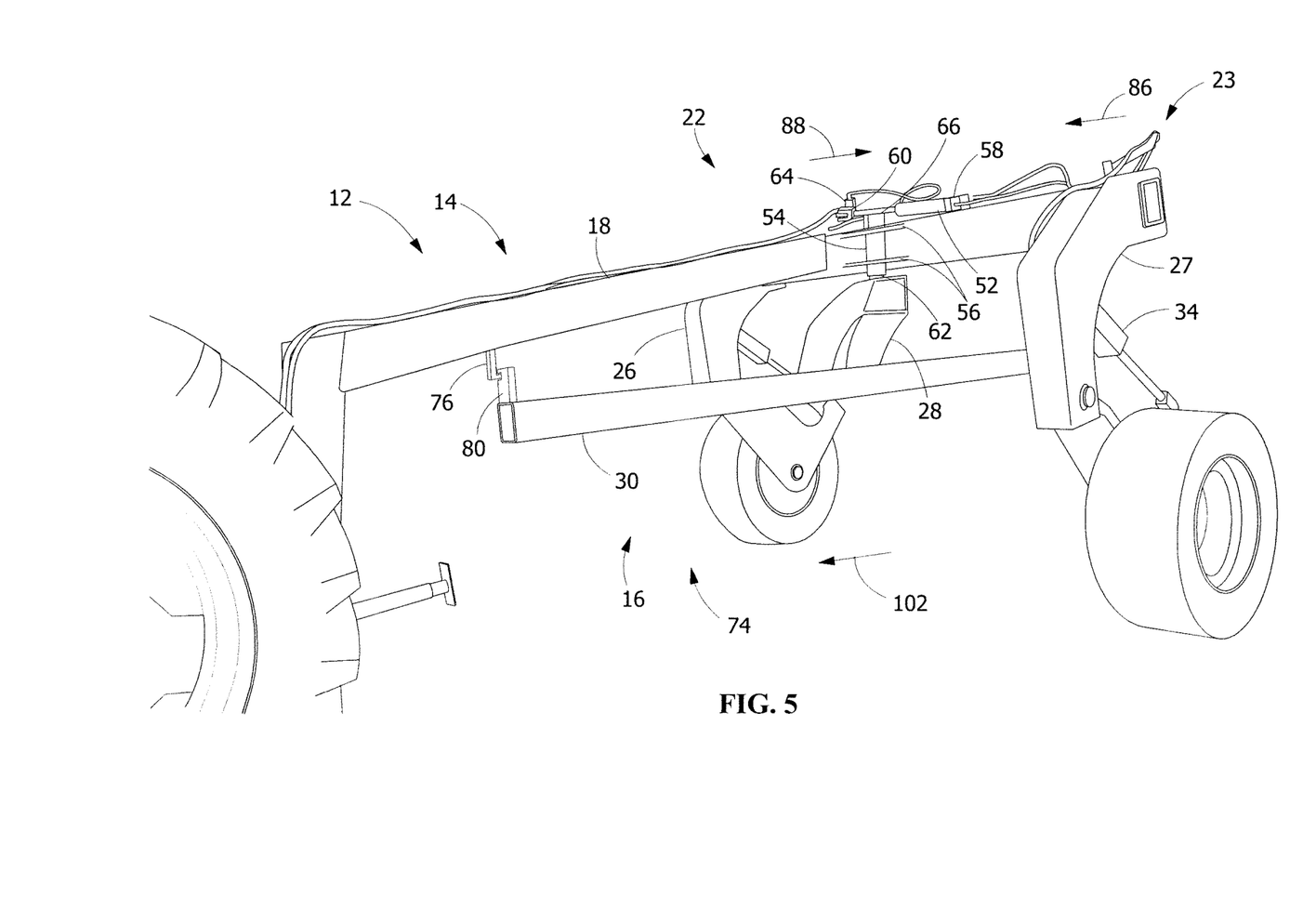
FIG. 5 shows a reverse upper perspective rearwardly looking view of the frame of the planter in the road travel position according to an embodiment of FIG. 4.

As shown in FIG. 5, a pair of gussets 56 are secured at the junction between tongue 18 and structural member 20 for securing a sleeve 54. Sleeve 54 forms a pivotable connection 66 with a shaft 62 extending through sleeve 54. A lever 64 secured to one end of shaft 62 forms a pivotable connection 60 with one end of a hydraulic ram 52, with the other end of hydraulic ram 52 forming a pivotable connection 58 with structural member 21 or structural member 20. An end of shaft 62 is secured to a structural member 28 that is secured to a structural member 30, which structural members 28, 30 collectively forming part of frame portion 16.

In response to the actuation of hydraulic ram 52 as a result of flow of fluid to the hydraulic ram 52 from a fluid source (not shown) via interconnected fluid lines 36 such that the distance between opposed ends of hydraulic ram 52 is increased, lever 64 is urged to rotate about pivotable connection 66 which likewise rotates structural members 28, 30 of frame portion 16 about pivotable connection 66 toward a road travel position 74, as will be discussed in further detail below. As further shown in FIG. 4, in the road travel position 74, a latch member 80 extending from an end of structural member 30 includes an angled slot 82 for receiving a protrusion 78 of a corresponding latch member 76, which provides stability by removing "bouncing" or upward/downward movement of the forward-facing end of structural member 30 relative to tongue 18.

In response to the actuation of hydraulic ram 52 as a result of flow of fluid to the hydraulic ram 52 from a fluid source (not shown) via interconnected fluid lines 36 such that the distance between opposed ends of hydraulic ram 34 is decreased, lever 64 is urged to rotate about pivotable connection 66 which likewise rotates structural members 28, 30 of frame portion 16 about pivotable connection 66 toward a raised laterally expanded position 72 (FIG. 6), as will be discussed in further detail below.

As shown in FIGS. 2-8, the operation of frame 12 of planter 10 is now discussed. As a starting point, as shown in FIG. 2 (and FIG. 1 for planter 10), frame 12 is in a working or planting position 68, in which opposed ends of structural member 30 of frame portion 16 are laterally secured between legs 26, 27 of respective structural members 22, 23. That is, structural member 30, which is sized to receive and support corresponding planter modules 100 (FIG. 1), such as 7 inch×7 inch rectangular tubing, is positioned such that a top surface 104 of structural member 30 is level with the field surface or ground, and longitudinal axis 106 of structural member 30 is transverse to direction of travel 102 of the planter 10 (FIG. 1) as towed behind tractor 11. Structural member 30 is vertically positioned at a height above the field surface or ground sufficient for planter modules 100 (FIG. 1) and crimping device 101 (FIG. 1) to operate as intended. The height of structural member 30 corresponds to the distance between opposed ends of one hydraulic ram 34 at pivotable connections 40, 42 of leg 26 and crank 38, and the other hydraulic ram 34 at pivotable connections 40, 42 of leg 27 and crank 38 each being generally minimized. Leg 24 of structural member 22 extends sufficiently outward from structural member 20 transverse to travel direction 102 such that leg 26 engages or is laterally secured to one end of structural member 30, such as guide 84 (FIG. 6) of leg 26 engaging one end of structural member 30 in working or planting position 68. Similarly, leg 25 (not shown in FIG. 2) of structural member 23 extends sufficiently outward from structural member 21 (not shown in FIG. 2) transverse to travel direction 102 such that leg 27 engages or is laterally secured to the other end of structural member 30, such as guide 84 (FIG. 6) of leg 26 engaging one end of structural member 30 in working or planting position 68.

Once planter 10 (FIG. 1) has completed planting in one field, and in preparation of the planter 10 being transported to another field involving travel or road travel, frame 12 is transitioned from working or planting position 68 to raised position 70 (FIG. 3). That is, as shown in FIG. 3, the distance between opposed ends of each of the hydraulic rams 34 in planting position 68 is increased, and by virtue of the pivotable connections and linkages between the corresponding cranks 38, hydraulic rams 34 and legs 26, 27, results in a rotational movement 108 of each crank 38 about its pivotable connections 44, 46, resulting in an amount of rolling of wheels 48 along the field surface or ground in travel direction 102. Simultaneously, the distance between pivotable connections 44, which correspond to the longitudinal axis 106 of structural member 30 of frame portion 16, and the field surface or ground is increased.

Once frame 12 is in raised position 70 (FIG. 3), frame 12 is then transitioned to a raised, laterally expanded position 72, as shown in FIG. 6. Raised, laterally expanded position 72 is achieved by increasing the distance between opposed ends of hydraulic ram 94 between pivotable connections 96, 98 (FIG. 7), resulting in leg 27 of structural member 23 being urged in a movement direction 110 that is transverse to directional travel 102 of the planter 10 (FIG. 1), and by increasing the distance between opposed ends of hydraulic ram 94 between pivotable connections 90 (FIG. 3), 92, resulting in leg 26 of structural member 22 being urged in a movement direction 112 that is transverse to directional travel 102 of the planter 10 (FIG. 1). In response to sufficiently moving legs 26, 27 in respective movement directions 112, 110, each leg 26, 27 is separated from its respective end of structural member 30, and a guide member 84 secured to each leg 26, 27 is likewise disengaged from each corresponding end of structural member 30 of frame portion 16. In one embodiment, as further shown in FIG. 6, actuation of hydraulic rams 94 occurs simultaneously with movement of the planter 10 (FIG. 1) in travel direction 102, in order to minimize stress loads otherwise associated with this movement if the planter 10 is not traveling, i.e., dragging tires or wheels in respective movement directions 110, 112 relative to the field surface or ground, as movement of legs 26, 27 in movement directions 112, 110 similarly results in movement of the wheels 48 in movement directions 112, 110 as a result of the operable connection between legs 26, 27, and their respective crank 38 and wheel 48. As is appreciated by one having ordinary skill in the art, the wheels of the planter continuously laterally surround structural member 30 of frame portion 16 when the planter is viewed from behind while the planter is traveling in a forward direction.

Figure 8:
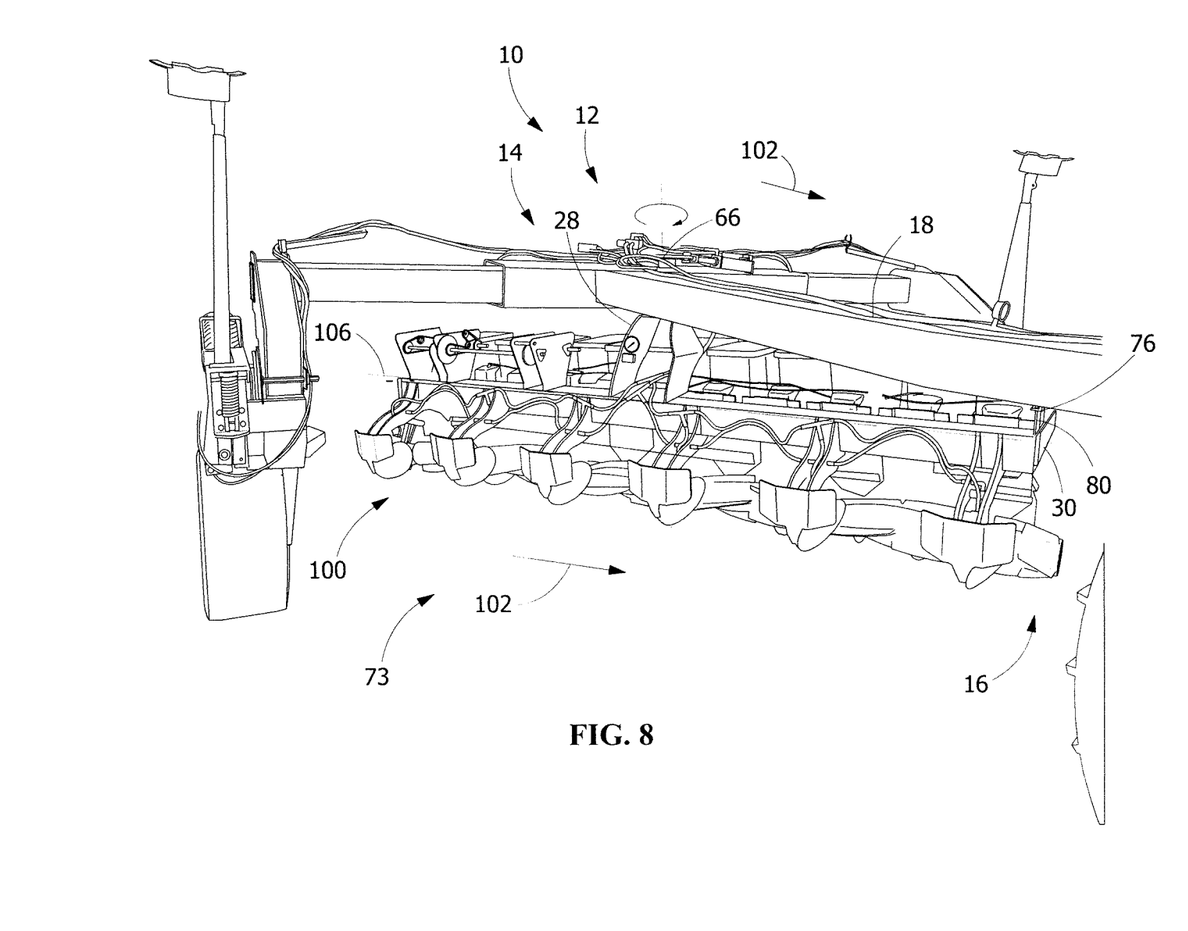
FIG. 8 shows an upper perspective rearwardly looking view of a planter in a raised, laterally expanded, partially rotated position according to an embodiment of the present disclosure.

Once frame 12 is in raised, laterally expanded position 72, frame 12 is then transitioned to a raised, laterally expanded, partially rotated position 73, as shown in FIG. 8. That is, structural member 30 and structural member 28 of frame portion 16 are rotated about pivotable connection 66 from an orientation in which longitudinal axis 106 of structural member 30, formerly extending transverse to travel direction 102 when in raised, laterally expanded position 72, is rotated to coincide with travel direction 102. In raised, laterally expanded, partially rotated position 73, latch members 76, 80 are brought into engagement with one another to provide stability of frame portion 16 relative to frame portion 14 during travel of planter 10. As is appreciated by one having ordinary skill in the art, the wheels of the planter continuously laterally surround structural member 30 of frame portion 16 when the planter is viewed from behind while the planter is traveling in a forward direction.

Once frame 12 is in raised, laterally expanded, partially rotated position 73, frame 12 is then transitioned to a raised, laterally collapsed position 74 or road travel position as shown in each of FIGS. 5, 7 (FIG. 5 shows a reverse upper perspective rearwardly looking view of frame 12, while FIG. 7 shows an upper perspective forwardly looking view of frame 12). That is, as further shown in FIG. 5, raised laterally collapsed position 74 is achieved by decreasing the distance between opposed ends of hydraulic ram 94 between pivotable connections 96, 98 (FIG. 7), resulting in leg 27 of structural member 23 being urged in a movement direction 86 that is transverse to directional travel 102 of the planter 10 (FIG. 1), and by decreasing the distance between opposed ends of hydraulic ram 94 (FIG. 3) between pivotable connections 90 (FIG. 3), 92, resulting in leg 26 of structural member 22 being urged in a movement direction 88 that is transverse to directional travel 102 of the planter 10 (FIG. 1).

In response to sufficiently moving legs 26, 27 in respective movement directions 86, 88, each leg 26, 27 is separated by a distance significantly less compared to the distance between legs 26, 27 when in planting position 68 (FIG. 2). In one embodiment, legs 26, 27 are separated by a predetermined spacing, and wheels 48 are separated by a predetermined spacing. In one embodiment, actuation of hydraulic rams 94 occurs simultaneously with movement of the planter 10 (FIG. 1) in travel direction 102, in order to minimize stress loads otherwise associated with this movement if the planter 10 (FIG. 1) is not traveling, i.e., dragging tires in respective movement directions 86, 88 relative to the field surface or ground, as movement of legs 26, 27 in movement directions 86, 88 similarly results in movement of the wheels in movement directions 86, 88 as a result of the operable connection between legs 26, 27, and their respective crank 38 and wheel 48. As is appreciated by one having ordinary skill in the art, the wheels of the planter continuously laterally surround structural member 30 of frame portion 16 when the planter is viewed from behind while the planter is traveling in a forward direction. In raised, laterally collapsed position 74 or road travel position, latch members 76, 80 remain in engagement with one another, as established in raised, laterally expanded, partially rotated position 73, to continue to provide stability of frame portion 16 relative to frame portion 14 during travel of planter 10.

As a result of the novel movable frame portions 14, 16 of the present disclosure, in one embodiment, the width of planter frame 12 may be reduced from 17 feet wide in working or planting position 68 to 10 feet 6 inches in travel or road travel position or a raised, laterally collapsed position 74, which greatly enhances safety during road travel of the planter. As is appreciated by one having ordinary skill in the art, the wheels of the planter continuously laterally surround structural member 30 of frame portion 16 when the planter is viewed from behind while the planter is traveling in a forward direction.

In summary, the frame 12 (FIG. 1) of the planter of the present disclosure may be transitioned from planting position 68 (FIG. 2) to a raised position 70 (FIG. 3), then to a raised, laterally expanded position 72 then to a raised, laterally expanded, partially rotated position 73 (FIG. 8), and then to a road travel position or a raised, laterally collapsed position 74 (FIG. 5). It is understood by those skilled in the art that the sequence of positions identified immediately above from road travel position or a raised, laterally collapsed position 74 (FIG. 5) is simply reversed to return the planter to planting position 68 (FIG. 2).

As a result of the arrangement of components of the frame of the planter of the present disclosure, there is a substantially constant weight on each of the wheels 48, achieving a balance for each of the operating positions 68, 70, 72, 73, 74, and also providing a positive hitch weight, resulting in enhanced safety for the operator.

Figure 9:
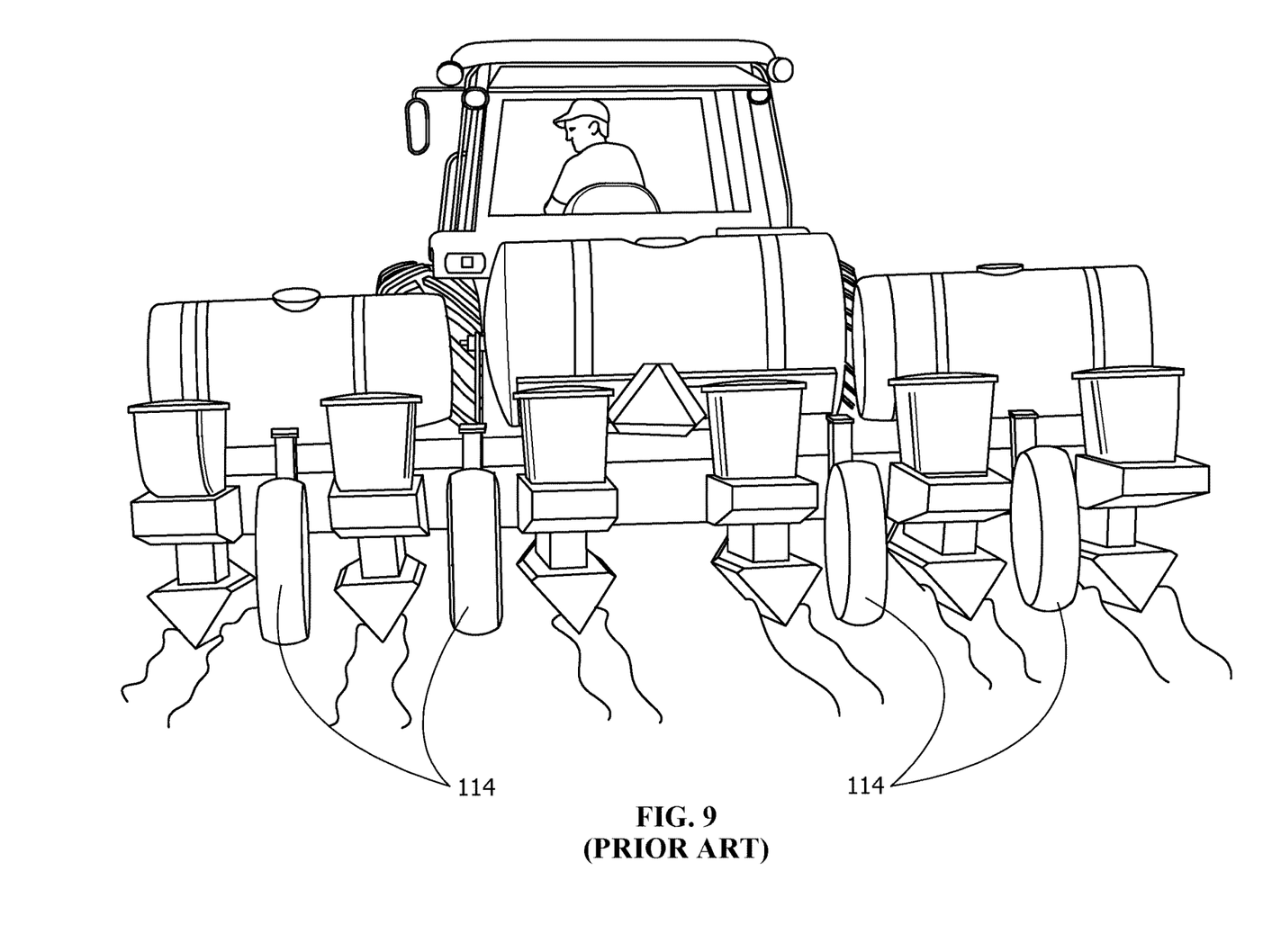
FIG. 9 shows a forwardly looking view of a prior art planter.

It is to be understood that the frame of the present disclosure can accommodate all major brands of planter modules, and any widths between the adjacent planter modules, including, but not limited to 15 inches, 20 inches, 24 inches, 30 inches, 36 inches, 42 inches, or any width in between. This is in stark contrast to conventional planters, such as shown in FIG. 9, which include load-carrying wheels 114 for supporting the planter that are distributed at fixed positions along the width of the planter. As a result of the fixed positions of wheels 114, the minimum distance between adjacent planter modules separated by wheel 114 is likewise essentially fixed, such as 30 inches. The "open bar" arrangement of structural member 30 of frame portion 16 of the present disclosure lacks such load-carrying wheels, as wheels 48 (FIG. 3) that support the planter frame are operably connected to frame portion 14, permitting one or more agricultural modules to be infinitely positionable along the length of structural member 30 of frame portion 16.

For purposes herein, the term "open bar" and the like is intended to mean that essentially, the entire length of structural member 30 (FIG. 3) is available for carrying agricultural modules. Although structural member 28 FIG. 3) is secured to a generally central portion of structural member 30, mechanical fasteners and fastening arrangements can be adapted to permit placement of one or more agricultural modules at any position along the length of the structural member. For example, for current modules for use with soybeans, a typical spacing between adjacent modules is 15 inches. Moreover, if spacing between future module constructions is different than 15 inches, including spacing of less than 15 inches, structural member 30 would also be able to accommodate the different spacing.

As a result of the compact construction of the frame of the present disclosure, especially in the road travel position or a raised, laterally collapsed position 74 (FIG. 5), the operator of the vehicle has an unobstructed view previously unavailable, resulting in enhanced safety.

While the disclosure has been described with reference to a preferred embodiment, it will be understood by those skilled in the art that various changes may be made and equivalents may be substituted for elements thereof without departing from the scope of the disclosure. For example, telescoping or linear devices may be hydraulically driven, and/or these devices may be driven with hydraulics, air, water, or electricity or any combination thereof.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An agricultural device comprising:
   a first frame portion rotatably carrying a second frame portion for carrying at least one agricultural module, the second frame portion being rotatable relative to the first frame portion between a first position generally perpendicular to a direction of travel of the device and a second position generally parallel to the direction of travel of the device, the first frame portion having a pair of rolling elements for supporting the first frame along a support surface;
   wherein the pair of rolling elements being laterally movable relative to the first frame portion in a direction perpendicular to the direction of travel of the device;
   wherein the pair of rolling elements continuously laterally surround the second frame when viewed from behind a forward direction of travel of the device.

2. The device of claim 1, wherein the first frame portion includes a telescoping member operably connected to each rolling element of the pair of rolling elements.

3. The device of claim 2, wherein a ram is at least partially positioned within each of the telescoping members.

4. The device of claim 1, wherein the first frame portion is adapted to vertically raise and lower the second frame portion.

5. The device of claim 1, wherein the second frame portion engages the first frame portion in both the first position and the second position.

6. The device of claim 5, wherein the first frame portion includes a pair of guides for engaging the first frame portion in the first position.

7. The device of claim 1, wherein each rolling element of the pair of rolling elements is operatively connected to the first frame portion by a crank.

8. The device of claim 1, wherein the device maintains a positive hitch weight in all operating positions.

9. The device of claim 1, wherein the at least one agricultural module is infinitely positionable along a length of the second frame portion.

10. A method for converting an agricultural device between a working position and a travel position, comprising:
 providing the agricultural device of claim 1 having the first frame portion and the second frame arranged in a working position;
 vertically raising the second frame portion relative to the support surface with the first frame portion;
 laterally moving the pair of rolling elements and associated structure of the first frame portion away from one another in a direction perpendicular to the direction of travel of the device until the associated structure of the first frame portion and corresponding structure of the second frame are disengaged;
 rotating the second frame portion from the first position to the second position;
 laterally moving the pair of rolling elements and the associated structure of the first frame portion toward one another in a direction perpendicular to the direction of travel of the device until the pair of rolling elements are separated by a predetermined spacing.

11. The method of claim 10 further comprises subsequent to laterally moving the pair of rolling elements and associated structure of the first frame portion toward one another,
 vertically lowering the second frame portion relative to the support surface to a travel position.

12. The method of claim 10, wherein rotating the second frame portion from the first position to the second position includes bringing the first frame portion and the second frame portion into engagement.

13. The method of claim 10, wherein each of laterally moving the pair of rolling elements and associated structure of the first frame portion away from one another, and laterally moving the pair of rolling elements and associated structure of the first frame portion toward one another further includes simultaneously moving the device in the travel direction.

14. An agricultural device comprising:
 a first frame portion rotatably carrying a second frame portion for carrying at least one agricultural module, the second frame portion being rotatable relative to the first frame portion between a first position generally perpendicular to a direction of travel of the device and a second position generally parallel to the direction of travel of the device, the first frame portion having a pair of rolling elements for supporting the first frame along a support surface;
 wherein the pair of rolling elements being laterally movable relative to the first frame portion in a direction perpendicular to the direction of travel of the device;
 wherein the pair of rolling elements continuously laterally surround the second frame when viewed from behind a forward direction of the device;
 wherein the at least one agricultural module is infinitely positionable along a length of the second frame portion.

15. The device of claim 14, wherein the first frame portion includes a telescoping member operably connected to each rolling element of the pair of rolling elements.

16. The device of claim 15, wherein a ram is at least partially positioned within each of the telescoping members.

17. The device of claim 14, wherein the first frame portion is adapted to vertically raise and lower the second frame portion.

18. The device of claim 14, wherein the second frame portion engages the first frame portion in both the first position and the second position.

19. The device of claim 14, wherein each rolling element of the pair of rolling elements is operatively connected to the first frame portion by a crank.

20. The device of claim 14, wherein the device maintains a positive hitch weight in all operating positions.

* * * * *